United States Patent [19]

Wiltsey

[11] 4,033,438
[45] July 5, 1977

[54] ROLLER SPLINE

[75] Inventor: Howard E. Wiltsey, Racine, Wis.

[73] Assignee: Eaton Corporation, Cleveland, Ohio

[22] Filed: Feb. 26, 1976

[21] Appl. No.: 662,051

[52] U.S. Cl. .............................. 192/84 A; 64/11 R; 64/23; 188/163; 403/356; 403/357

[51] Int. Cl.² .................... F16D 27/10; F16D 3/64; F16B 3/00

[58] Field of Search ........................ 192/84 A, 84 C; 64/11 R, 23, 27 NM; 188/163; 403/356, 357

[56] References Cited

UNITED STATES PATENTS

| | | | |
|---|---|---|---|
| 1,220,483 | 3/1917 | Williams et al. | 64/23 |
| 1,467,185 | 9/1923 | Meriam | 64/11 R |
| 2,560,958 | 7/1951 | King | 64/11 R |
| 2,942,710 | 6/1960 | Wiedmann | 192/84 A |
| 2,989,857 | 6/1961 | Helland et al. | 64/11 R |
| 3,240,350 | 3/1966 | Petersen | 64/23 X |
| 3,421,783 | 1/1969 | Sakai | 403/357 |
| 3,543,899 | 12/1970 | Colbert | 403/356 X |
| 3,620,044 | 11/1971 | Latour | 64/27 NM X |
| 3,959,990 | 6/1976 | Golitz | 64/11 R X |

FOREIGN PATENTS OR APPLICATIONS

| | | | |
|---|---|---|---|
| 1,118,286 | 3/1956 | France | 64/11 R |
| 1,272,050 | 4/1964 | Germany | 64/23 R |
| 704,497 | 2/1954 | United Kingdom | 64/11 R |

Primary Examiner—Allan D. Herrmann
Attorney, Agent, or Firm—Teagno & Toddy

[57] ABSTRACT

An electromagnetic friction coupling includes an armature assembly, a pole assembly and a coil energizable to effect engagement of the armature and pole assemblies. The armature assembly includes an armature plate and a hub member which are coupled together by means for compensating for misalignment between the armature plate and hub members. The hub member is adapted to be connected to a shaft for rotation therewith and the armature member is disposed coaxially of the hub member and is connected for rotation therewith. The hub member and armature plate include outer and inner surfaces, respectively, which include a plurality of substantially semicircular recesses disposed therein. Each of the recesses disposed on the armature plate and the complementary recesses on the hub member define a plurality of substantially cylindrical openings therebetween each of which is adapted to receive a rotatable cylindrical pin therein to couple the hub member and armature plate. The cylindrical pins are loosely disposed in the cylindrical openings to provide for angular and radial movement of the armature plate and hub member relative to each other while compensating for angular and radial misalignment of the hub member and armature plate. The cylindrical pins are free to rotate within the cylindrical openings to distribute the wear thereon evenly about the outer surface thereof and are deformable to provide for uniform loading while compensating for misalignment of the armature plate and hub member.

5 Claims, 6 Drawing Figures

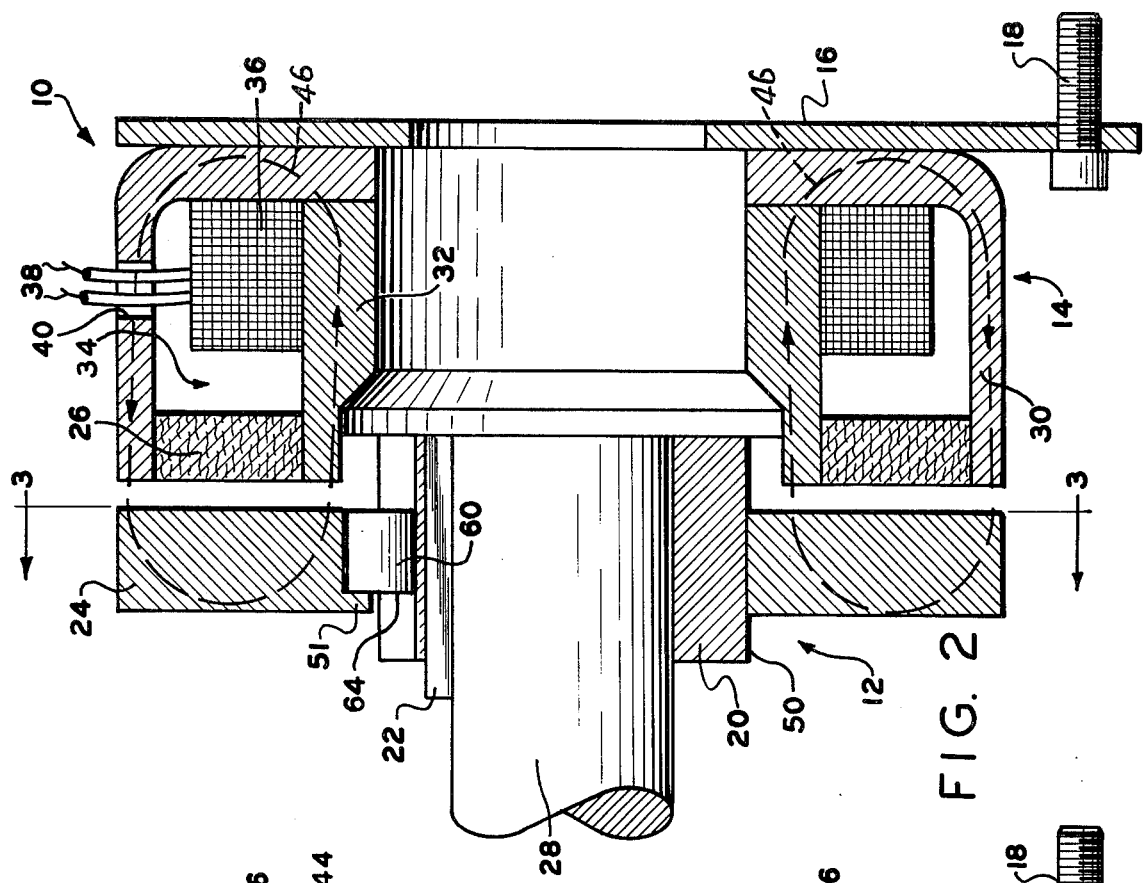
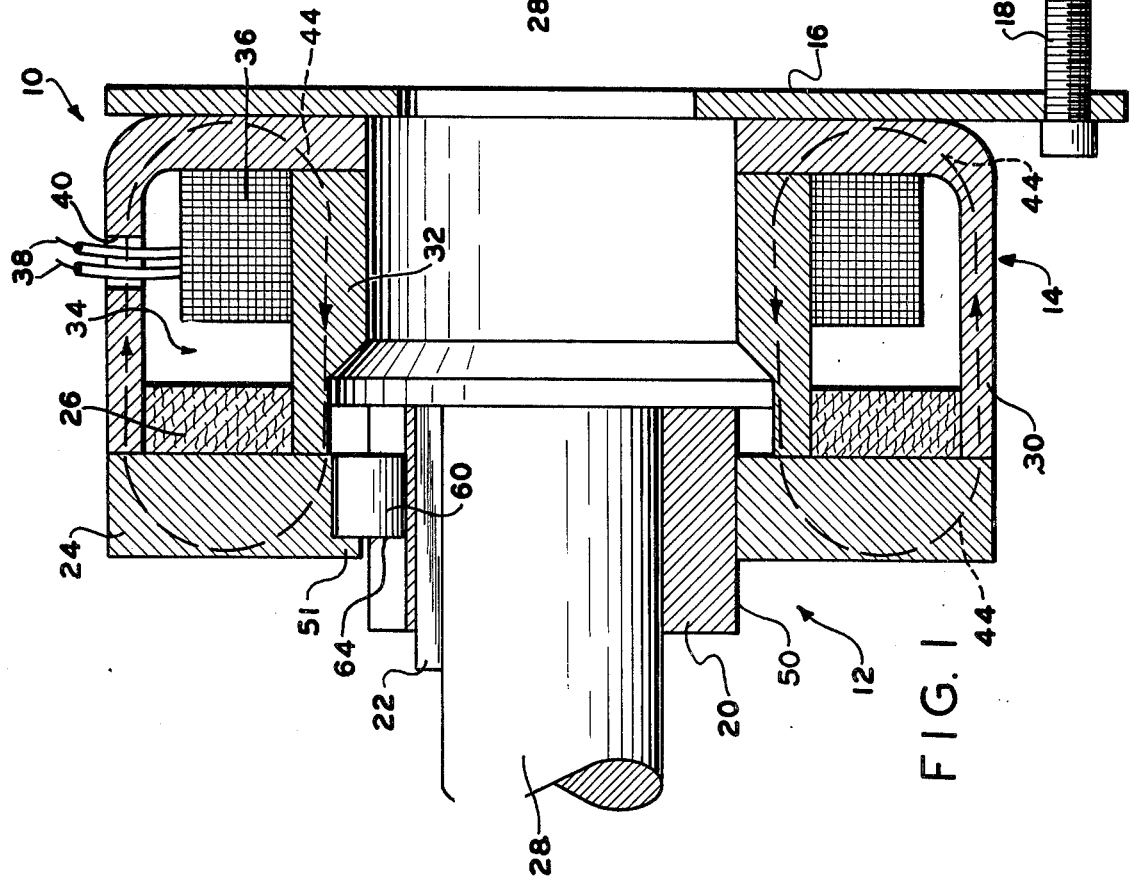

ROLLER SPLINE

BACKGROUND OF THE INVENTION

Known electromagnetic friction couplings, such as disclosed in the Jaeschke U.S. Pat. No. 3,730,317, utilize a coupling means which provide for axial movement between the armature plate and the hub member in a direction parallel to the axis of rotation. While such coupling means provide for axial movement parallel to the axis of rotation they do not provide sufficient compensation for angular and radial misalignment between the hub member and armature plate. Such misalignment can cause serious damage to the electromagnetic coupling. Moreover, the wear characteristics of such coupling means has been less than desirable due to the fact that the coupling means was generally formed integrally with the armature plate and/or hub member. Hence, if wear and subsequent deterioration occurred the entire hub and/or armature plate would have to be replaced.

SUMMARY OF THE INVENTION

The present invention relates to an electromagnetic coupling and further to an electromagnetic coupling including an armature plate, a hub for supporting the armature plate for rotation and a pole assembly wherein relative axial movement is provided between the armature plate and hub member by means which compensates for misalignment between the armature plate and the hub member.

The present invention provides an electromagnetic coupling including an armature plate, a hub member for supporting the armature plate for rotation, a pole assembly and a coil for establishing a driving relationship between the armature plate and pole assembly when the coil is energized. The hub member and armature plate include outer and inner surfaces, respectively, having a plurality of arcuate recesses disposed therein. The arcuate recesses disposed on the outer and inner surfaces are complementary and define a plurality of substantially cylindrical openings therebetween. A plurality of cylindrical pin members are provided, one of which is adapted to be disposed in each of the cylindrical openings to couple the hub member and armature plate. A diametric clearance is maintained between the pin members and the cylindrical openings to allow relative axial movement between the hub member and armature plates while enabling the pin members to compensate for angular misalignment between the hub member and armature plate while also compensating for wear of the friction surfaces.

Another provision of the present invention is to provide an electromagnetic coupling including rotatable driven and driving members with the driving and driven members having an engaged position establishing a driving relationship between the members and a disengaged position permitting relative rotation therebetween. Actuating means is provided for effecting axial movement of one of said members between the engaged and disengaged positions. The one member includes an outer ring member having an inner surface thereon. The inner surface includes a plurality of first arcuate recesses disposed thereon. A hub member is disposed substantially concentric to the outer ring member and includes an outer surface thereon including a plurality of second arcuate recesses disposed thereon. The plurality of first and second recesses form a plurality of sets of first and second complementary recesses with each set defining substantially cylindrical openings therebetween. A plurality of rotatable cylindrical pins, one of which is disposed in each of the plurality of cylindrical openings is provided for coupling the outer ring member and hub members together. The cylindrical pins are rotatably disposed in the substantially cylindrical openings to provide axial movement between the outer ring and hub members in a direction substantially parallel to the axis of rotation of the outer ring and hub members and to compensate for misalignment between the outer ring and hub members.

A still further provision of the present invention is to provide an electromagnetic coupling as set forth in the preceding paragraph wherein the diameter of the cylindrical pins is less than the diameter of the cylindrical openings defined by the first and second arcuate recesses to establish a diametric clearance therebetween to enable the cylindrical pins to be skewed relative to the longitudinal axis of the outer ring and hub members to thereby compensate for angular radial misalignment between the outer ring and hub members.

Further provision and advantages of the present invention will become more apparent from a reading of the detailed description thereof in conjunction with a view of the figures.

BRIEF DESCRIPTION OF THE DRAWINGS

FIG. 1 is a cross-sectional view illustrating the electromagnetic coupling in a coupled condition.

FIG. 2 is a cross-sectional view similar to FIG. 1 illustrating the position of the armature after axial movement to an uncoupled position.

DESCRIPTION OF A PREFERRED EMBODIMENT

Figure 4:
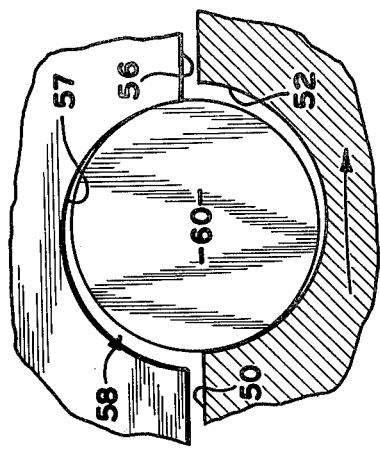
FIG. 4 is a fragmentary side cross-sectional view more fully illustrating the structure when the hub is skewed relative to the armature member.

The electromagnetic coupling, illustrated in FIG. 1, comprises in general a brake 10. The brake 10 includes an armature assembly 12 and a pole assembly 14. The pole assembly 14 includes a mounting plate 16 which is fixed by a bolt 18 to a suitable structure not illustrated to prevent rotation of the pole assembly 14. The armature assembly 12 includes a hub portion 20 which is keyed to a driven shaft 28 for rotation therewith by a key 22. Fixed to the splined hub portion 20 for rotation therewith is an armature plate 24. The armature plate 24 is adapted to move axially between a first position in which the armature plate 24 engages with a friction material 26 disposed on the pole assembly 14 as is illustrated in FIG. 1 and a second position in which the armature plate 24 is spaced from the friction material 26 of the pole assembly 14 as is illustrated in FIG. 2. When the armature plate 24 is spaced apart from the friction material 26 of the pole assembly 14, as is illustrated in FIG. 2, the shaft 28 will be free to rotate. However, when the armature plate 24 engages with the friction material 26, the armature plate 24 will be braked and rotation of the shaft 28 will be prevented.

The pole assembly 14 includes an outer pole member 30 which is fixed to the mounting plate 16 and an inner pole member 32 which is disposed coaxially of the outer pole member 30. The outer and inner pole members, 30 and 32, respectively, cooperate to form an annular chamber 34 in which is disposed a coil member 36. The coil member 36 is operable to be energized to effect movement of the armature plate 24 between its engaged and disengaged positions relative to the friction material 26.

The coil 36 is fixed to the inner pole member 32 and is operable to be energized by a pair of leads 38 which project through an opening 40 in the outer pole member 30. Energization of the coil 36 to a first polarity will effect engagement of the armature plate 24 with the friction material 26 and energization of the coil 36 to a second polarity, opposite the first polarity, will effect disengagement of the armature plate 24 and the friction material 26.

When the coil 36 is energized to its first polarity a flux path 44 will be established from the coil 36, through the inner pole member 32, through the armature plate 24, and through the outer pole member 30 back to the coil 36. The flux path 44, which is disclosed for illustrated purposes as moving in a counterclockwise direction in FIG. 1, will magnetize the armature plate 24 to the first polarity to thereby effect axial movement of the armature plate 24 relative to the hub 20 to effect engagement of the armature plate 24 with the friction surface 26 of the pole assembly 14. Engagement of the armature plate 24 with the friction surface 26 will stop rotation of the shaft 28 keyed to the armature plate 24.

When the coil 36 is energized to its second polarity a flux path 46 will be formed from the coil 36 through the outer pole member 30, through the armature plate 24, and through the inner pole member 32 to the coil 36. The flux path 46, is illustrated in FIG. 2 as occurring in a clockwise direction due to the energization of the coil 36 to its polarity. Energization of the coil 36 to its second polarity will be adapted to effect magnetization of the armature plate 24 to a second polarity, opposite the first polarity, so that the armature plate 24 will move axially away from the pole assembly 14 to disengage from the friction material 26 to enable the shaft 28 to rotate freely.

The coil 36 will be energized to control the polarity of the armature plate 24 and will not change the polarity of the pole assembly 14. Hence, when the armature plate 24 is magnetized to its first polarity, it will have a polarity opposite to that of the pole assembly 14 and will be attracted thereto and when the armature plate 24 is magnetized to its second polarity it will have the same polarity as the pole assembly 14 and will be repulsed therefrom. While the coil 36 has been disclosed as being energized to first and second polarities to effect axial movement of the armature plate 24 between its engaged and disengaged positions, it should be appreciated that other means of effecting engagement and disengagement of the armature plate 24 with the pole assembly 14 could be effected. For example, spring or other known devices could be utilized rather than reversing the polarity of the coil 36.

Figure 3:
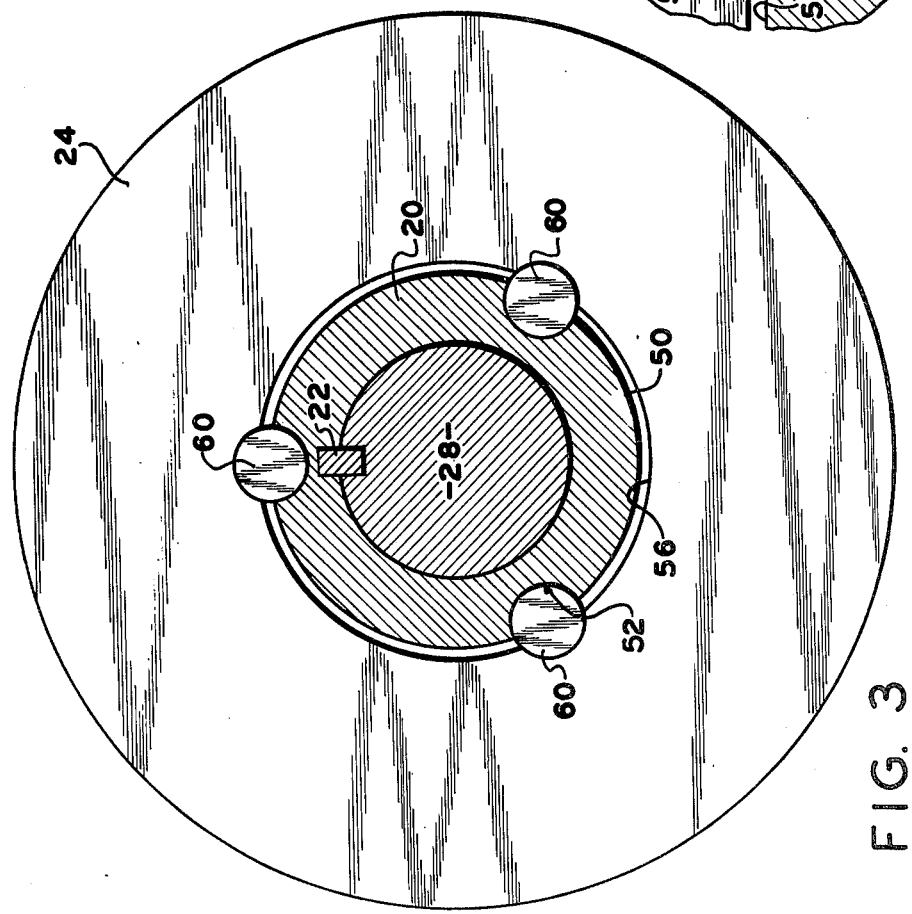
FIG. 3 is a cross-sectional view taken approximately along the lines 3—3 of FIG. 2 more fully illustrating the rollers for coupling the hub and armature.

Coupling means are provided to couple the armature plate 24 to the hub member 20 while providing for axial movement of the armature plate 24 relative to the hub member 20. The coupling means allow axial movement of the armature plate 24 relative to the hub member 20 to compensate for wear of the armature plate 24 and friction surface 26 during use of the coupling. The coupling means also act to compensate for angular and radial misalignment between the hub member 20 and the armature plate 24. To this end, the hub member 20 includes a generally cylindrical outer surface 50 more fully illustrated in FIG. 3 in which is formed a plurality of arcuate recesses 52. The armature plate 24 or ring member 24 includes an inner surface 56 which has a generally cylindrical configuration and which includes a plurality of arcuate recesses 57 disposed therein.

When the hub 20 and armature plate 24 are arranged substantially coaxial as disclosed in FIGS. 1-2 the arcuate recesses 52 in the hub 20 become complementary to the arcuate recesses 57 in the armature plate 24 and cooperate to define a plurality of cylindrical openings or chambers 58 between the inner surface 56 of the armature plate 24 and the outer surface 50 of the hub 20. Each of the cylindrical openings 58 is defined by the complementary arcuate recesses 52 and 57 and is adapted to receive a cylindrical pin 60 therein. It should be appreciated that location of the cylindrical pins 60 in the cylindrical openings 58 effectively couples the hub 20 to the armature plate 24 for rotation therewith. A pin retaining lip 51 can be integrally formed on the inner portion of the armature plate 24 to locate the pins 60 within the cylindrical openings 58. The pin retaining lip 51 would operate to bear on a end surface 64 of the pin 60 as illustrated in FIG. 1 to prevent removal of the pin 60 from the cylindrical opening 58 in a leftwardly direction as viewed in FIG. 1.

As may be viewed in FIG. 2 the coupling 10 is adapted to have the armature plate 24 moved axially relative to the hub 20 which is fixed to input shaft 28. To this end it can be seen that the armature plate 24 has moved axially to the left in FIG. 2 relative to its position shown in FIG. 1. The pin 60 allows sliding motion of the inner surface 56 of the armature plate 24 relative to the inner surface 50 of the hub 20. This provides for the axial movement of the armature plate 24 relative to the hub member 20.

Figures 5A, 5B:
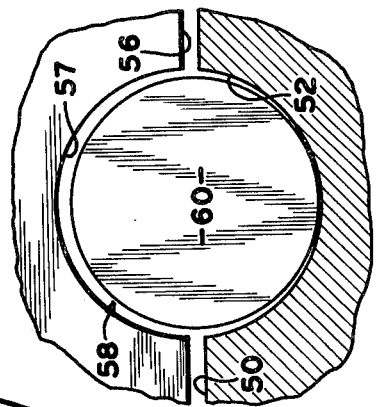
FIGS. 5a and 5b are enlarged fragmentary views illustrating the position of the rollers relative to the cylindrical openings when the hub member and armature plate are unloaded and loaded, respectively, relative to each other.

The arcuate recesses 52 and 57, as more fully illustrated in FIGS. 5a and 5b, are substantially semicircular and as described hereinabove are complementary to define the cylindrical chambers 58 for receiving the pins 60. A diametrical clearance of between two and eight thousandths of an inch (0.002–0.008 inch) is maintained between the outer surface of the pins 60 and the walls which define the cylindrical opening 58. The diametrical clearance provides for rotation of the pins 60 relative to the hub 20 and armature plate 24 to evenly distribute wear about the pins 60 outer surface and also enable the pins 60 to compensate for misalignment between the hub 20 and armature plate 24 as will be more fully described. The diametrical clearance enables the armature plate 24 to move axially relative to the hub 20. The diametrical clearance also causes the pin 60 to raise up in the cylindrical opening 58 from its position illustrated in FIG. 5a to its position illustrated in FIG. 5b when the armature plate 24 is rotated by the hub 20 in response to rotation of the shaft 28. The diametrical clearance further provides for slight relative rotation of the armature plate 24 relative to the hub member 20 when loading occurs. The slight relative rotation of the armature plate 24 relative to the hub 20 and the raising of the pin 60 upon the application of a load thereto as effected by the diametrical clearance causes slight uneven loading on the pin 60 which causes further rotation of the pin 60 relative to the cylindrical opening 58. Moreover, rotation of the pin 60 is also effected upon axial movement of the armature plate 24 relative to the hub member 20 which effects axial movement of the arcuate surface 57 relative to the arcuate surface 52 while uneven loading on the pin member 60 takes place as illustrated in FIGS. 5a-5b. Thus, the cylindrical pin member 60 will rotate upon relative axial movement between the hub 20 and the armature plate 24. During normal rotation of the coupling 10 the pin 60 will rotate to a slight degree due to the uneven loading exerted thereon effected by the diametrical clearance maintained between the pin 60 and the arcuate recesses which defines the cylindrical chamber 58. Rotation of the pins 60 during use of the coupling 10 will distribute wear substantially evenly about the outer periphery of the pins 60 to increase the life of the pins 60.

During normal use of the coupling the hub member 20 is disposed concentric to the armature plate 24. However, sometimes the hub 20 may become skewed relative to the armature plate 24 as illustrated in FIG. 4. The diametrical clearance maintained between the pins 60 and cylindrical openings 58 allows the pins 60 to rock in the cylindrical openings 58 as illustrated in FIG. 4 to compensate for angular misalignment between the hub member 20 and armature plate 24. If this clearance was not maintained the pin 60 would not be able to be skewed relative to the axis of rotation of one of the members 20 or 24 to compensate for misalignment therebetween. Moreover, the diametrical clearance also allows compensation for radial misalignment between the hub member 20 and the armature plate 24.

Preferrably, the pin member 60 is formed from a deformable material which can conform to the shape of the opening 58 defined by the arcuate recesses 52 and 57 even if the hub member 20 is slightly skewed from the armature plate 24. While the cylindrical pin 60 has been illustrated as a solid member, a tubular pin could be utilized. Moreover, materials such as powdered metal have been found suitable for utilization in construction of the pin 60. The powdered metal can be impregnated with a lubricant to increase the life of the pin member 60. Other materials such as plastic or nylon could be utilized in the formation of the pin member 60. It is preferrable that the pin member 60 be constructed from a material which wears faster than the material from which the hub 20 and armature plate 24 are constructed. This causes wear of the pin member 60 rather than the hub member 20 and armature plate 24. Thus, after the pin 60 has been worn a substantial amount the pin may be replaced while utilizing the original hub 20 and armature plate 24.

From the foregoing, it should be apparent that a new and improved electromagnetic friction coupling has been provided which includes an armature assembly, a pole assembly and a coil energizable to effect a driving engagement between the armature and pole assemblies. The armature assembly includes a hub member having an outer surface having a plurality of arcuate recesses disposed therein and an armature plate having an inner surface having a plurality of arcuate recesses disposed therein. The arcuate recesses of the hub member and armature plate cooperate to define cylindrical openings for receiving cylindrical pins therein to couple the hub member and armature plate. A diametric clearance is maintained between the cylindrical pins and the cylindrical opening in which they are received to enable the pins to rotate relative to the cylindrical openings to thereby distribute wear evenly about the pins outer surface and to compensate for misalignment of the armature plate and hub members while providing axial movement of the armature plate relative to the hub. While the present invention has been illustrated as being utilized in an electromagnetic brake it should be apparent that the invention can be utilized in electromagnetic clutches or other types of couplings wherein coupled driving and driven members move axially relative to each other.

I claim:

1. An electromagnetic coupling comprising an armature plate, a hub member disposed substantially concentric to said armature plate for supporting said armature plate for rotation therewith, a pole assembly, said pole assembly and armature plate having an engaged position establishing a driving relationship therebetween and a disengaged position, a coil energizable to effect engagement of said pole assembly and armature plate, roller coupling means for coupling said armature plate and hub member and compensating for misalignment therebetween, said hub member including an outer surface having a plurality of first arcuate recesses disposed therein, said armature plate including an inner surface having a plurality of second arcuate recesses disposed therein, said plurality of first and second arcuate recesses forming a plurality of sets of first and second complementary recesses, each of said plurality of sets of complementary recesses defining a substantially cylindrical opening between said outer surface of said hub and said inner surface of said armature plate, and said roller coupling means including a plurality of rotatable cylindrical pins, one of which is disposed in each of said cylindrical openings for coupling said armature plate and hub member together, said cylindrical pins having a diameter less than the diameter of said cylindrical openings to establish a diametric clearance between said cylindrical pins and said cylindrical openings which allows relative axial movement between said armature plate and hub member in a direction parallel to the axis of rotation of said armature plate and hub member and which compensates for misalignment therebetween, said cylindrical pins being deformable to enable said cylindrical pins to conform to the shape of said substantially cylindrical openings while compensating for misalignment of said armature plate and hub member.

2. An electromagnetic coupling as defined in claim 1 wherein said cylindrical pins are formed from a softer material than from which said armature plate and hub member are formed to provide for wear of said cylindrical pins in preference to wear of said first and second arcuate recesses formed in said hub member and armature plate, respectively.

3. An electromagnetic coupling as defined in claim 1 wherein said outer surface of said hub member and said inner surface of said armature plate have a cylindrical configuration.

4. An electromagnetic coupling as defined in claim 1 wherein said diametric clearance between said cylindrical pins and said cylindrical openings is at least two thousandths (0.002) of an inch to enable the axis of rotation of said hub member to be skewed from the axis of rotation of said armature plate.

5. An electromagnetic coupling as defined in claim 4 wherein said diametric clearance allows cylindrical pins to rotate relative to said cylindrical openings to distribute wear evenly about the outer surface of said cylindrical pins.

* * * * *

UNITED STATES PATENT AND TRADEMARK OFFICE
CERTIFICATE OF CORRECTION

PATENT NO. : 4,033,438
DATED : July 5, 1977
INVENTOR(S) : Howard E. Wiltsey

It is certified that error appears in the above-identified patent and that said Letters Patent are hereby corrected as shown below:

Col. 1, line 49:          "plates" should read---plate---.

Col. 3, line 42:          Before "polarity" ---second---is omitted.

line 64:          "spring" should read---springs---.

Col. 8, line 1:          Before "cylindrical" ---said---is omitted.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks